Feb. 23, 1943.　　　D. B. ELFES ET AL　　　2,311,936
ENGINE BLOWER CONTROL
Filed April 1, 1941

Inventor
Donald B. Elfes &
Clarence J. Swigert
By Blackmore, Spencer & Oliver
Attorneys Patented Feb. 23, 1943

2,311,936

UNITED STATES PATENT OFFICE 2,311,936

ENGINE BLOWER CONTROL

Donald B. Elfes and Clarence J. Swigert, Detroit, Mich., assignors to General Motors Corporation, Detroit, Mich., a corporation of Delaware Application April 1, 1941, Serial No. 386,360

8 Claims. (Cl. 123—119)

This invention relates to internal combustion engines provided with a blower for supplying air or combustible mixture thereto, at superatmospheric pressure.

The invention is particularly applicable to two stroke cycle engines working under a wide range of speed and load conditions.

It relates particularly to an internal combustion engine with a positive displacement type of blower driven by the engine at a fixed speed ratio. The actual charge requirements of the engine depend on the load on the engine, so that if the capacity of such a blower is such as to provide sufficient charge for maximum engine torque at any speed, some means of reducing the capacity of the blower for less than maximum engine torque is required.

The object of the invention is an engine and blower combination having a regulatable throttle valve in the inlet to the blower, with means for controlling the depression between the throttle valve and the blower inlet, independently of the degree of throttle opening and the blower speed.

A more specific object of the invention is an internal combustion engine with a blower having a regulatable throttle valve in the blower inlet, with means for bypassing excess charge from the outlet to the inlet side of the blower, to an extent increasing with the speed of the engine, in any position of the throttle valve less than fully open.

A further object of the invention is an engine blower control in which the bypass valve is opened proportionately to the degree of depression existing between the throttle valve and the blower inlet.

The above and other objects of the invention will be apparent as the description proceeds.

According to the invention, the throttle and bypass valves which are balanced butterfly valves, are connected by an interlinkage such that the bypass valve is held closed whenever the throttle valve is fully open. In all other positions of the throttle valve, the bypass valve is moved independently of the throttle valve, in response to changes in the depression on the inlet side of the blower, there being lost motion in the interlinkage to permit of this.

The drawing shows the application of the invention to a four-cylinder radial, U-type, two-cycle engine.

Figures 1, 2:
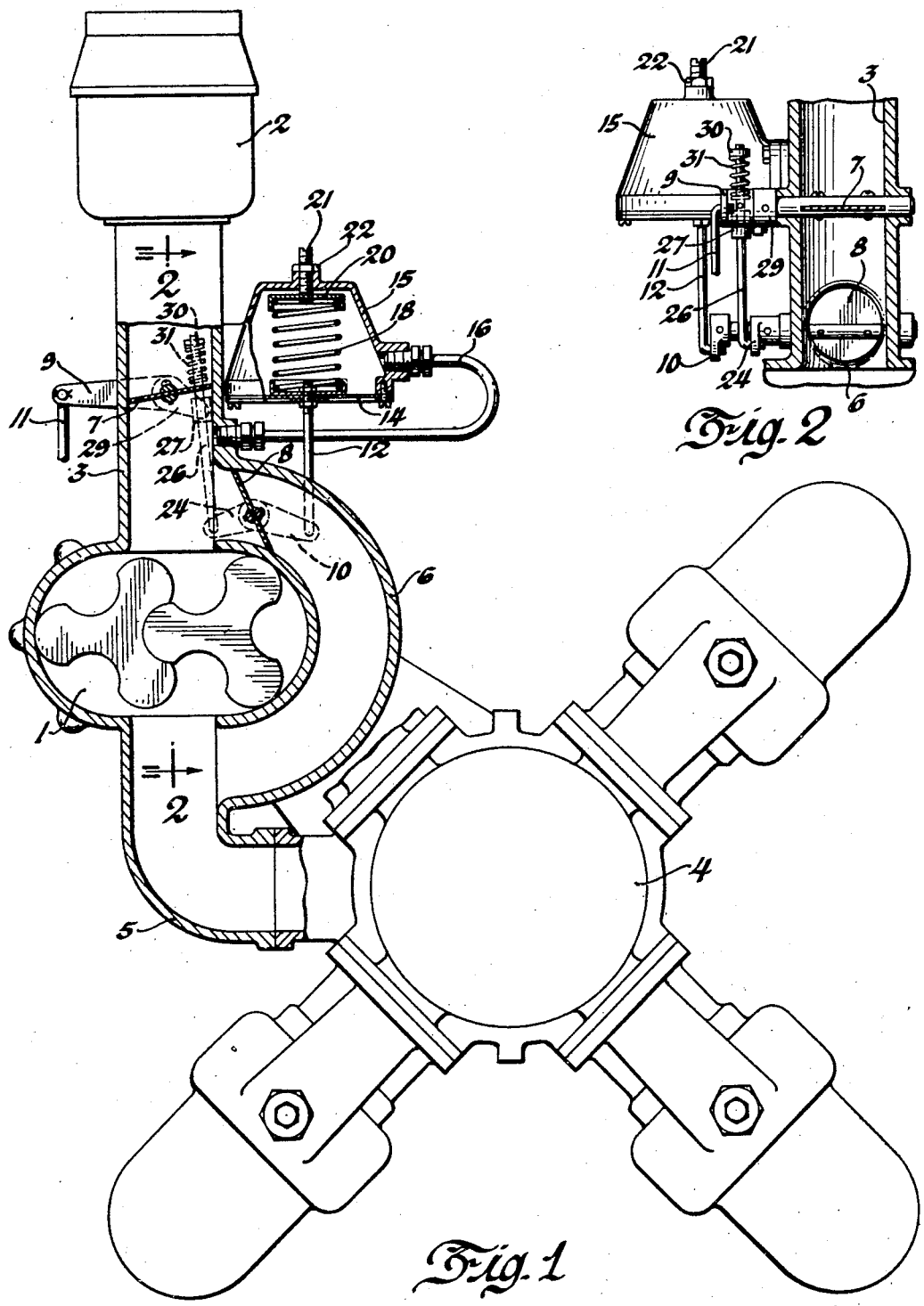
Figure 1 is an elevation, partly in section, of a construction according to the invention.
Figure 2 is a part sectional view on line 2—2 of Figure 1.

The blower 1 has its inlet side connected to a carburetor 2 by a pipe 3, and its outlet side connected to the intake ports of an engine 4 by a pipe 5.

There is a bypass passage 6 around the blower from the outlet to the inlet side thereof.

In the inlet pipe 3, between the carburetor 2 and the bypass passage 6, there is a balanced butterfly throttle valve 7 with an operating arm 9, and in the bypass passage there is a balanced butterfly bypass valve 8, with an operating arm 10.

The throttle valve 7 is moved, manually or otherwise, by a rod 11. The bypass valve 8 is moved by a rod 12 which is connected to a diaphragm 14 which constitutes a closure for a chamber 15 which is connected by a pipe 16 to the inlet side of the blower, between the throttle valve 7 and the blower. The diaphragm 14 is subjected to the depression on the inlet side of the blower through the pipe 16.

Movement of the diaphragm 14 upon an increase in the depression in the inlet pipe 3, opens the bypass valve 8 against the pressure of spring means 18 tending to keep the valve 8 closed. The spring means 18 is conveniently disposed in the chamber 15 between the diaphragm 14 and a seating 20. The seating 20 is mounted on a screw 21 threaded in the wall of the chamber 15 and locked by a nut 22, so that the spring loading may be varied by a turning adjustment of the screw 21.

Pivotally connected to an arm 24 of the bypass valve 8 is a rod 26 which slides in a block 27 pivoted on a lever arm 29 of the throttle valve 7. Between the block 27 and a collar 30 on the rod is a spring 31. The arrangement is such that the throttle valve 7 and the bypass valve 8 may be moved independently of each other, with relative lost motion between the rod 26 and the block 27, except when the throttle valve 7 is fully open, and the spring 31 is loaded between the block 27 and the collar 30, to a sufficient extent to hold the bypass valve 8 closed.

The operation of the arrangement is as follows:

In starting, with the engine turning at cranking speed, and with the engine throttle valve either partially or completely closed, the speed is so low that the depression created is insufficient to lift the diaphragm against the spring pressure thereon, and the bypass valve remains closed, giving full blower output.

In the idling position of the throttle valve, the depression is normally sufficient to open the bypass valve to some extent, so that small increases in the load at idling speed can be compensated for by closing movement of the bypass valve.

Opening of the throttle valve to accelerate the engine will reduce the depression, and thereby cause closing of the bypass valve which will automatically increase the blower output. When the throttle valve is fully opened, the lost motion in the interlinkage between the throttle valve and the bypass valve is taken up to such an extent that the spring 31 is loaded and holds the bypass fully closed, giving full blower output, whatever the load on the engine or its speed.

It will be appreciated that the bypass valve has low inertia, is almost completely balanced, and hence is very sensitive, while requiring little or no damping. By proper selection of the load and rate of the diaphragm spring, any desired change of depression with load, over the speed range of the engine, may be obtained.

We claim:

1. In combination, an internal combustion engine, a blower with an inlet, and an outlet for supplying air to the engine, a throttle valve in the inlet to the blower, a bypass passage from the outlet to the inlet side of the blower, at a point between the throttle valve and the blower, and a bypass valve in the bypass passage; said bypass valve being responsive to changes in the depression at the inlet side of the blower between the throttle valve and the blower.

2. In combination, an internal combustion engine, a blower with an inlet, and an outlet for supplying air to the engine, a throttle valve in the inlet to the blower, a bypass passage from the outlet to the inlet side of the blower, at a point between the throttle valve and the blower, and a bypass valve in the bypass passage; and means for opening said bypass valve as the depression at the inlet side of the blower between the throttle valve and the blower increases, and vice versa.

3. The combination according to claim 2, in which the means for opening and closing the bypass valve, includes a diaphragm having one side subjected to said depression and the other side subjected to atmospheric pressure, the bypass valve being operatively connected to the diaphragm.

4. The combination according to claim 2 in which the means for opening and closing the bypass valve includes a diaphragm having one side subjected to said depression and the other side subjected to atmospheric pressure, the bypass valve being operatively connected to the diaphragm, there being spring means tending to keep the bypass valve closed in opposition to the effect of the depression on the diaphragm.

5. The combination according to claim 2 in which the means for opening and closing the bypass valve includes a diaphragm having one side subjected to said depression and the other side subjected to atmospheric pressure, the bypass valve being operatively connected to the diaphragm, there being spring means tending to keep the bypass valve closed in opposition to the effect of the depression on the diaphragm, said spring means being adjustable and having the requisite spring rate to maintain the depression at the inlet side of the blower at the required value over the speed range of the engine.

6. In a two-cycle engine with a carburetor, a blower between the carburetor and the engine, a throttle valve between the carburetor and the blower, means to operate the throttle valve, a bypass passage between the outlet and the inlet side of the blower, a bypass valve in the bypass passage, said bypass valve being operated by the depression at the inlet side of the blower between the throttle valve and the blower, and lost motion connecting means between the throttle valve and the bypass valve whereby the bypass valve is held closed when the throttle valve is fully open, but movement of the bypass valve independently of the throttle valve is otherwise permitted.

7. The combination according to claim 6 in which the bypass valve is connected to a diaphragm which is deflected by the depression in opposition to the pressure of adjustable resilient means tending to keep the bypass valve closed.

8. In a two-cycle engine with a carburetor, a blower between the carburetor and the engine, a throttle valve between the carburetor and the blower, a bypass passage from the outlet to the inlet side of the blower between the throttle valve and the blower, a bypass valve in the bypass passage controlled by a diaphragm subjected to the depression between the throttle valve and the blower and tending to open the bypass valve as the depression increases to maintain the depression constant, adjustable spring means opposing opening movement of the bypass valve and variable to maintain the depression at a desired value over the speed range of the engine, and a lost motion interlinkage between the throttle valve and the bypass valve permitting independent movement thereof except in the fully open position of the throttle valve when the bypass valve is held closed thereby.

DONALD B. ELFES.
CLARENCE J. SWIGERT.